(12) United States Patent
Hong et al.

(10) Patent No.: US 8,177,381 B2
(45) Date of Patent: May 15, 2012

(54) DIFFUSION BAR WITH SPACER COLLAR RING

(75) Inventors: Qi Hong, Rochester, NY (US); Herong Lei, Webster, NY (US); Robert P. Bourdelais, Pittsford, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 61 days.

(21) Appl. No.: 12/749,730

(22) Filed: Mar. 30, 2010

(65) Prior Publication Data

US 2011/0242838 A1    Oct. 6, 2011

(51) Int. Cl.
*G09F 13/04*    (2006.01)
(52) U.S. Cl. ....... 362/97.3; 362/97.1; 362/612; 385/901
(58) Field of Classification Search ........ 362/97.1–97.3, 362/606, 607, 608, 612, 613; 385/901
See application file for complete search history.

(56) References Cited

U.S. PATENT DOCUMENTS

| 6,721,102 B2 | 4/2004 | Bourdelais et al. |
| 7,324,174 B2 * | 1/2008 | Hafuka et al. ............... 362/97.1 |
| 2008/0291668 A1* | 11/2008 | Aylward et al. ............... 362/310 |
| 2010/0315574 A1 | 12/2010 | Mizuuchi et al. |

FOREIGN PATENT DOCUMENTS

| EP | 2 105 656 A1 | 9/2009 |
| WO | WO 2008 056660 A1 | 5/2008 |

OTHER PUBLICATIONS

European Search Report of corresponding European Application No. 11 16 0303, Jul. 7, 2011.

* cited by examiner

*Primary Examiner* — Stephen F Husar
(74) *Attorney, Agent, or Firm* — Edwin Oh

(57) ABSTRACT

The present invention provides an integrated backlight illumination assembly for an LCD display comprising, a plurality of solid state light sources for providing a point light source and a plurality of light guide films having light redirecting areas provided between the plurality of solid state light sources for redirecting and spreading the point light sources to a uniform plane of light. The invention further provides at least one polymer diffusion bar covering said solid state light sources and spacer collar rings comprising an optical spacer, collar section and an anchoring feature, wherein the spacer collar rings are located around a perimeter of the diffusion bar.

9 Claims, 11 Drawing Sheets

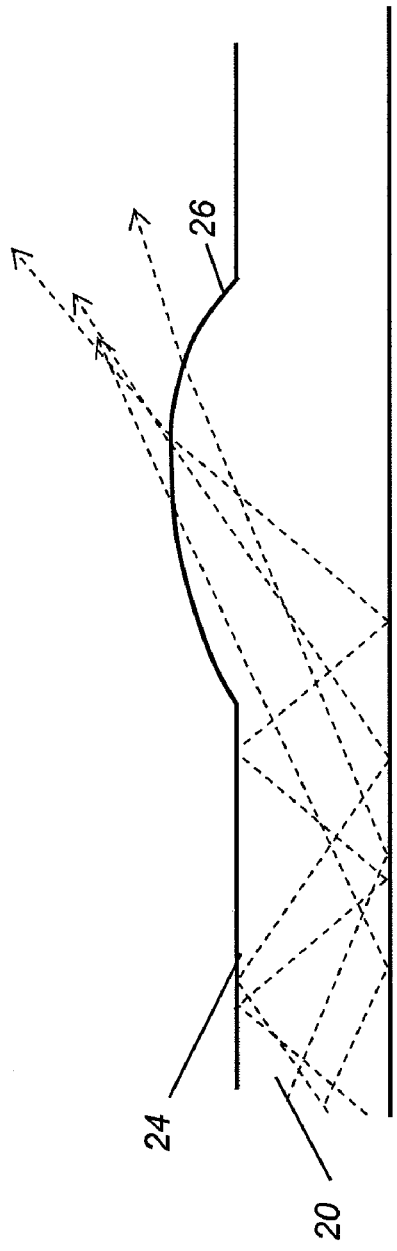
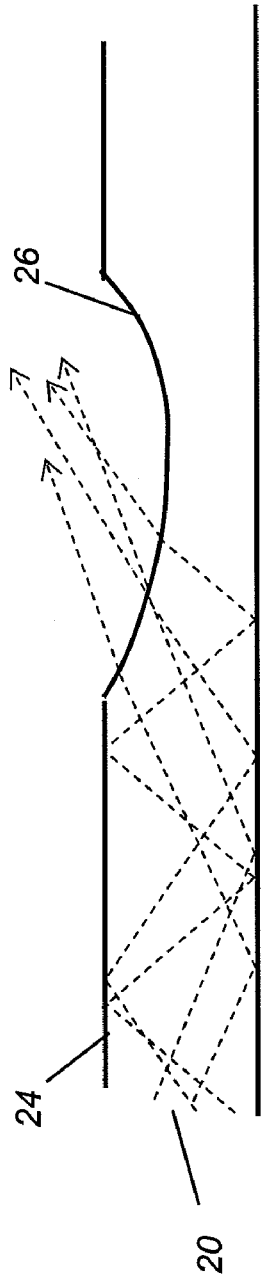

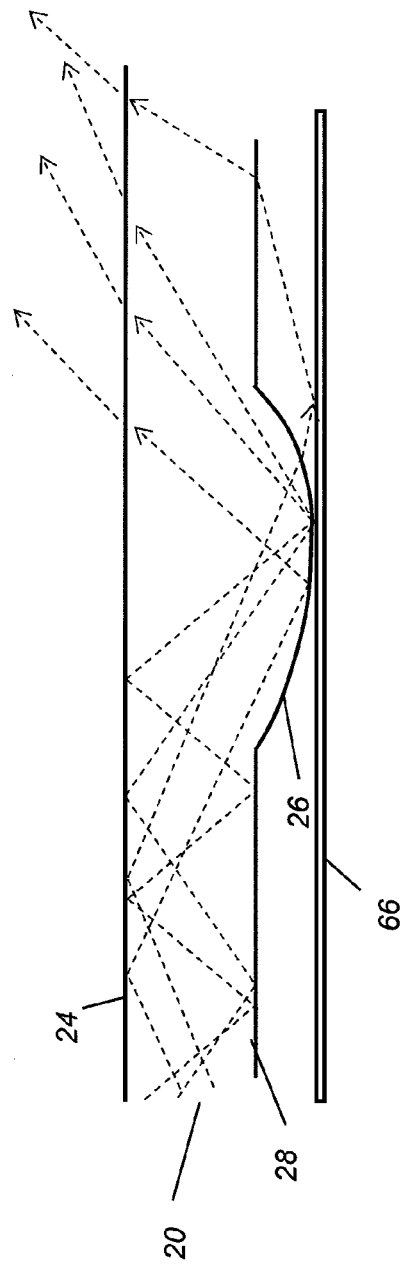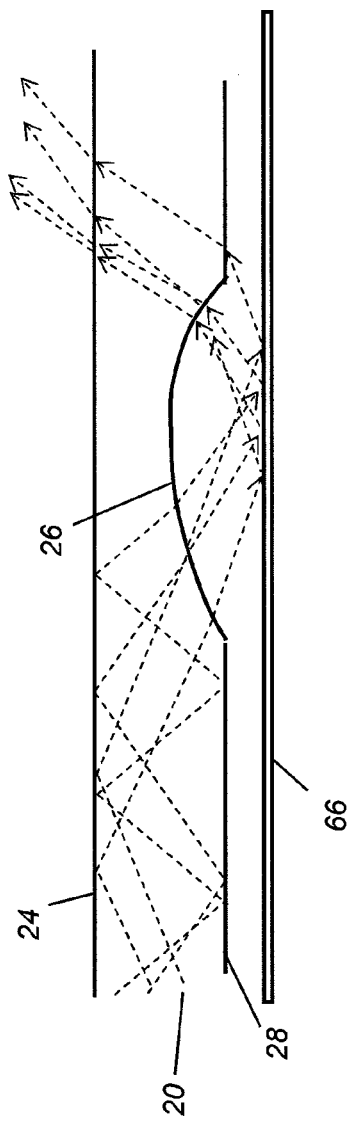
FIG. 3C
FIG. 3D

32

32

DIFFUSION BAR WITH SPACER COLLAR RING

FIELD OF THE INVENTION

The present invention relates to display illumination and more particularly relates to optical coupling clip used to increase coupling efficiency of a point light source into a thin polymer light guiding film.

BACKGROUND OF THE INVENTION

Transmissive Liquid Crystal Display (LCD) panels offer a compact, lightweight alternative to other types of displays, but require some type of backlight illumination to provide the light for modulation. Backlight illumination for LCD and similar displays is typically provided by a light-providing surface that is positioned behind the LCD panel, relative to the viewer, and that redirects light from one or more light sources through the LCD panel. One exemplary type of light-providing surface is a Light Guiding Plate (LGP). The LGP acts as a waveguide, using Total Internal Reflection (TIR) for redirecting incident light that it receives from one or more sources that are positioned along its side edges. Some type of surface featuring is provided on the LGP in order to extract internally reflected light and redirect this light toward the display panel.

Among drawbacks with solutions such as that proposed in the Goto et al. disclosure are the relative thickness and overall bulk of the conventional light guide plate. Conventional LGPs often exceed the thickness of the LCD panel itself. With the advent of larger displays such as LCD TV, and with the development of more compact solid-state light sources, such as Light-Emitting Diodes (LEDs), there is a need for an LGP solution that offers a thinner profile, weighs less, and is more flexible than existing designs. As displays continue to grow larger in scale and with increased use of more flexible substrates, there is growing demand for a more flexible LGP, with thickness approaching 1 mm.

A number of solutions have been proposed for LGP devices that are better suited to smaller and more flexible displays. However, the solutions proposed thus far have inherent drawbacks that limit their utility or make them difficult to manufacture. For example, various types of light-extracting features formed in the LGP surface have been proposed. However, the geometrical profile of many of the proposed light-extracting features require manufacturing methods such as injection molding or hot compression molding. These fabrication methods may work well with thicker materials, but prove increasingly difficult and impractical as LGP thickness decreases. For example, a number of proposed solutions require surface light-extraction features that have 90-degree vertical walls. Sharp angles at this scale can be very difficult to fabricate, using any method, with known plastic materials at the needed size. Still others require features having a relatively high height:width aspect ratio, features difficult to fabricate for similar reasons. Although such structures may work well in theory and although their fabrication may be possible, the manufacturing problems they present make many of the proposed designs impractical for mass production. Little attention seems to have been paid to how an LGP having light-extraction features with sharply-angled sidewalls can be economically mass produced.

Further, LCD TVs that use LEDs as a light source commonly use thick LGP with top emitting LEDs arranged around the perimeter of the LGP. The top emitting LEDs, which are arranged around the perimeter of the LGP are typically located under the bezel. The bezel serves to cover and absorb the unwanted LED generated light not coupled into the LGP/LED interface. Thus, the uncoupled LED generated light is not used to illuminate the LCD and is wasted.

U.S. Pat. No. 6,721,102 (Bourdelais et al.) discloses a visible light diffuser formed with complex polymer lenses. The complex lenses disclosed in U.S. Pat. No. '102 are created by adding micrometer sized polymer lenses on the surface of low aspect ratio polymer base lenses. The ratio of smaller lenses to large lens is between 2:1 to 30:1. The diffuser disclosed in U.S. Pat. No. 6,721,102 is useful for diffusing light sources, in particular, LCD backlight sources.

While the use of LED as a lighting source for a LC panel allows the LED to be globally dimmed in registration with the image content to reduce overall power consumption for LCD TV, these edge-lit LED TVs typically are not capable of being locally dynamically dimmed because of the perimeter positioning of the LEDs. Local dimming of LEDs has been shown to further reduce the overall power consumption of LED illuminated LCD TV compared to global dimming as small groups of LED can be dimmed in registration with the image content. Further local dimming also been shown to significantly improve the contrast ratio of the displayed image compared to global dimming.

Thus, it is recognized that there is a need for light guiding surface solutions that allow the use of flexible materials, that can be produced with a relatively thin dimensional profile, that are designed for high-volume manufacture and can be local dimmed.

SUMMARY OF THE INVENTION

The present invention provides an integrated backlight illumination assembly for an LCD display comprising: a plurality of solid state light sources for providing a point light source; a plurality of light guide films having light redirecting areas provided between the plurality of solid state light sources for redirecting and spreading the point light sources to a uniform plane of light at least one polymer diffusion bar covering said solid state light sources; and spacer collar rings comprising an optical spacer, collar section and an anchoring feature, wherein the spacer collar rings are located around a perimeter of the diffusion bar.

BRIEF DESCRIPTION OF THE DRAWINGS

FIGS. 3A, 3B, 3C, and 3D show light behavior for incident light at features in the light-guiding film surface.

DETAILED DESCRIPTION OF THE INVENTION

Figure 1:
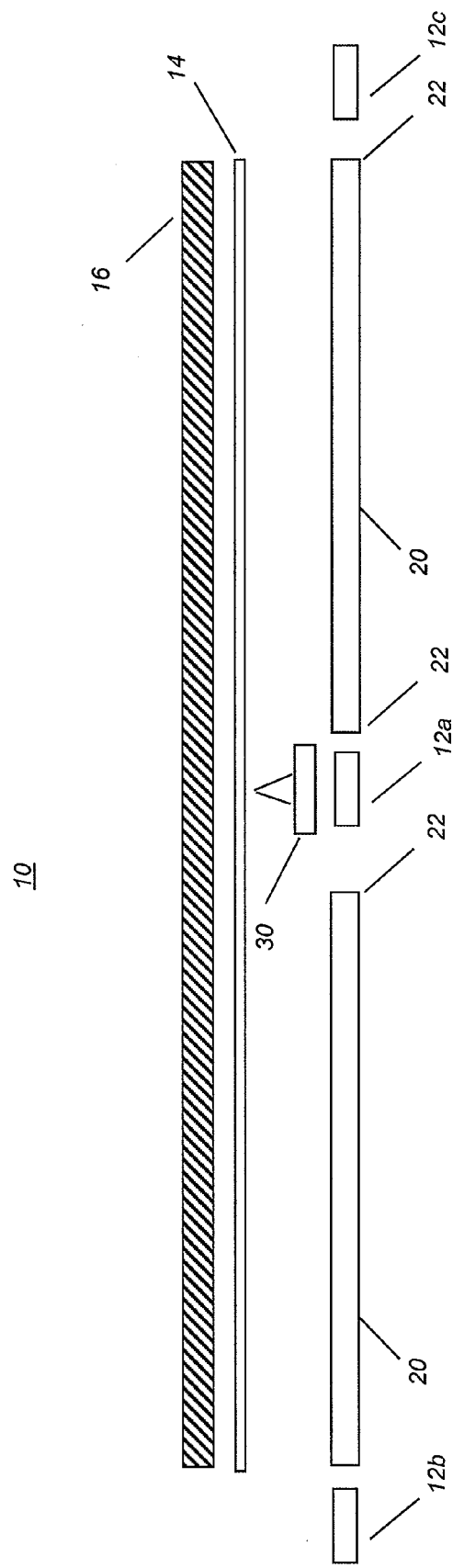
FIG. 1 shows a display apparatus using the light-guiding film of the present invention.

Referring to FIG. 1, there is shown, in cross-section, an embodiment of a display apparatus 10 with an backlight illumination assembly 18 using at least two light-guiding articles, light-guiding films (LGFs) 20, according to the present invention. A least a light sources 12 located between LGFs 20 direct illumination through an incident edges 22 of LGFs 20. To help the light output uniform along the display apparatus, at least two light source 12b and 12c can be located on the bezel. LGF 20 redirects this illumination outward, through one or more top diffusion films 14 and to a spatial light modulator, here an LCD panel 16, that modulates the illumination. Diffusion bar 32 is located above light source 12 and serves to diffuse light energy that is not optically coupled from point light source 12 into light guiding film 20. Diffusion bar 32 is provided with an optical spacer ring that provides spacing between top diffuser 14 and light guiding film 20. This space is critical to improving the light output uniformity of light guiding film 20 and diffusion bar 30.

Light source 12 can use any of a number of types of light-emitting elements. Conventional LGPs used for laptop computer and larger displays have used CCFLs (Cold-Cathode Fluorescent Lamps). LGF 20 of the present invention can use this thicker type of light source but is advantaged for use with thin-profile light sources such as a linear array of LEDs, linear array of OLED or other linear solid-state source.

Figure 2:
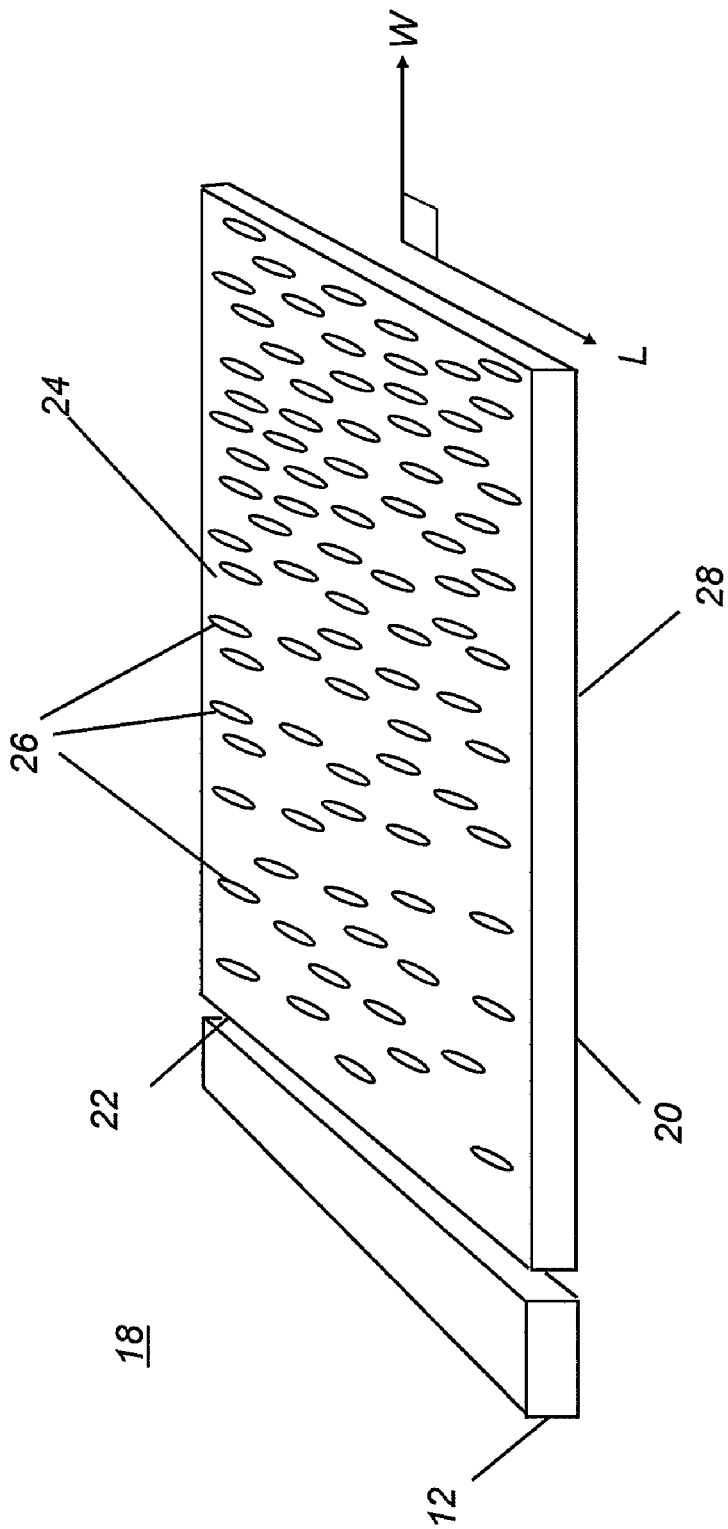
FIG. 2 shows a perspective view of the light-guiding film in one embodiment.

The perspective view of FIG. 2 shows aspects of LGF 20 and its light-exiting output surface 24 in illumination apparatus 18. As shown in FIG. 2, light source 12 directs illumination into incident edge 22 which is substantially orthogonal to output surface 24. Discrete light-extracting features 26 are formed on output surface 24, or, alternately, on a bottom surface 28, so that either or both output surface 24 and bottom surface 28 are patterned surfaces. As is seen in more detail in subsequent figures, light-extracting features 26 can be dimensionally extended along a length direction L of LGF 20 and can be narrower in a width direction W, orthogonal to length direction L. Light source 12 is generally arranged along length direction L. Light-extracting features 26 may be spatially distributed at equal intervals over surface 24 or 28; however, there can be advantages to embodiments in which the spatial distribution or the size or pitch of light-extracting features 26 varies with distance from incident edge 22 in width direction W, as is shown in FIG. 2 and described subsequently.

FIGS. 3A, 3B, 3C, and 3D show, in cross-section views, different arrangements of light-extracting features 26 on the patterned surface, either output surface 24 or bottom surface 28. Dashed lines in these figures indicate different exemplary light paths that illustrate the behavior of light-extracting features 26. Light is directed within LGF 20 by Total Internal Reflection (TIR), a principle familiar to those skilled in the light-guide art. The general function of light-extracting features 26, whether they protrude from or are formed into surface 24 or 28, is to frustrate TIR, causing this light to escape from LGF 20. FIGS. 3A and 3B show light behavior for two types of light-extracting features 26 formed on output surface 24, protruding from the surface or indented into the surface, respectively. In either case, internally reflected light is directed outward from output surface 24 when it impinges on the surface of light-extracting features 26.

FIGS. 3C and 3D show alternate embodiments in which light-extracting features 26 are formed on bottom surface 28. A reflective surface 66 is provided as part of illumination apparatus 18 (FIGS. 1 and 2) with these embodiments for redirecting light that has been extracted using light extracting features 26. Reflective surface 66 redirects this light back through LGF 20 and out through output surface 24.

Figure 4:
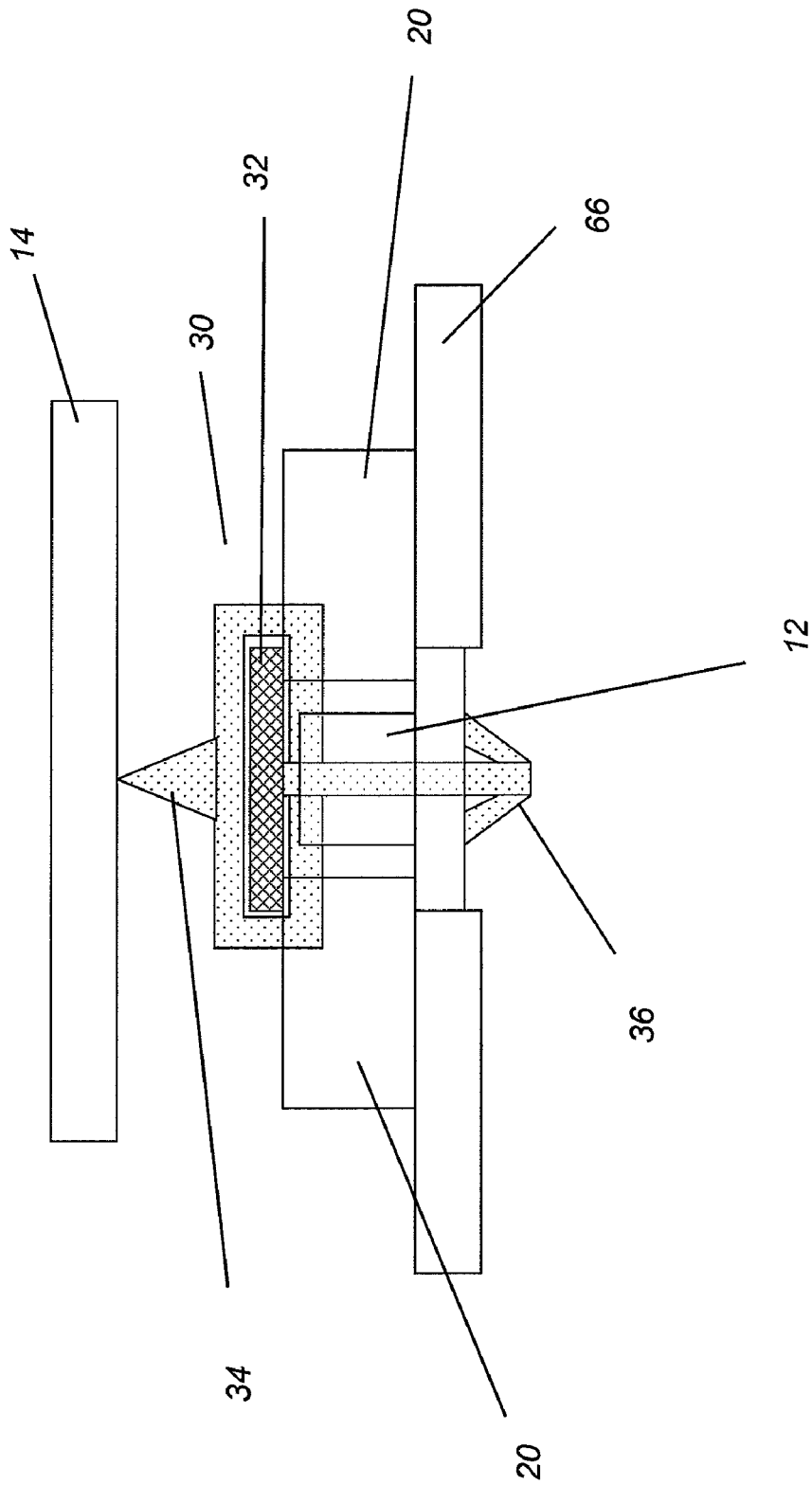
FIG. 4 is a perspective view showing a portion of the light-guiding film, diffusion bar, collar ring and a point light sources in one embodiment.

Referring now to FIG. 4, it shows a perspective view of the light guiding film 20 and point light sources 12. The light sources 12 are arranged along the incident edge of light guiding film 20. Below the light guiding films is a reflector 28 to reflect light incident on the reflector 28 toward the film 14. Light guiding films 20 are arranged sequentially or in a pattern to create a uniform, bright backlight illumination assembly. Point light sources 12 are in the illumination area of the backlight illumination assembly. For LCD TV applications, the lengths L of the light guiding films 20 are preferably greater than the width W. More preferably, the length L is greater than 10 times the width W of the light guiding films.

The light sources 12 in FIG. 4 are preferably arranged such that the backlight illumination assembly can be locally dimmed in registration with image content of display devices. Local dimming of the point light sources has been shown to both reduce power consumption of LCD and significantly improve the contrast ratio of LCD. By dimming sub-groupings of light sources 12, small, defined areas of light guiding film 20 can be dynamically dimmed by changing the current supplied to light sources 12. The size of the dimmed area is a function of the number of point light sources that are dimmed and the width W of the light guiding film 20. The light sources 12 can be arranged to input light into a single light guiding film 20 or can be arranged to input light into two adjacent light guiding films. Light sources preferably are arranged in a side by side configuration to allow for even light input into light guiding film 20.

Light sources 12 are distributed and arranged in between light guiding films 20. The distribution of the light sources 12 between light guiding films 20 results in a backlight assembly that has lower temperature gradients across the backlight illumination assembly compared to edge lit backlight units that have concentrated heat generation points. High temperature gradients such as those found with prior art edge illuminated backlight assemblies results in undesirable waving or creasing of optical components due to differences in thermal expansion resulting from temperature gradients. Further, higher temperature gradients that exist in edge illuminated backlight assemblies often require expensive, heavy metallic frames to be used to resist thermal waving and buckling.

The pitch of light sources 12 along the L direction is a function of the desired light output characteristics of light guiding film 20. The density, pitch and size of light extraction features 26 are also a function of the desired light output characteristics of light guiding film 20. The size, location and pitch of the light extraction features is also related to the optical output characteristics of light source 12. Important optical characteristics of light source 12 include chromaticity, light distribution and illuminance intensity. Generally, the density of light extraction features 26 is lower at the light incident surface 22 compared to the side opposite the light incident surface to allow for uniform extraction of light energy.

Still referring to FIG. 4, in one embodiment of the invention, light guiding film 20 is provided with a relative small amount area in the L and W plane that does not contain any light extraction features. This relatively small area, which is approximately 1 to 10% of the total area of light guiding film 20 in the L and W plane, functions as a mixing area for light sources 12. This mixing area is particularly important for multi-mode light sources such as RGB or RGBW or RGGB. The mixing area has been shown to be an efficient method for the mixing of multi-mode light sources to create white light with a higher color gamut than prior art white LEDs containing a blue die and yellow phosphor.

Around the perimeter of diffusion bar 30, a spacer color ring is provided. Spacer collar ring 30 comprises optical stand-off 34, diffusion bar opening section 38 and anchoring feature 36. Spacer collar ring 32 slides along the length of diffuser bar 32. The use of a diffusion bar and spacer collar ring allows the spacer collar ring to be precision injection molded and for the diffusion bar to be profile extruded. Profile extrusion is preferred for the diffusion bar segment because profile extrusion is lower in cost compared to injection molding and profile extrusion is well suited for long continuous sections that are required for large area LCDTV for example. The spacer collar ring are precision injection molded with a diffusion bar opening, optical spacer and anchoring feature. By combining an injection molded spacer collar ring with a profile extrusion molded diffusion bar, the resulting optical assembly is both low in cost and precise enough to diffuse point light sources located in the backlight assembly.

Figure 5:
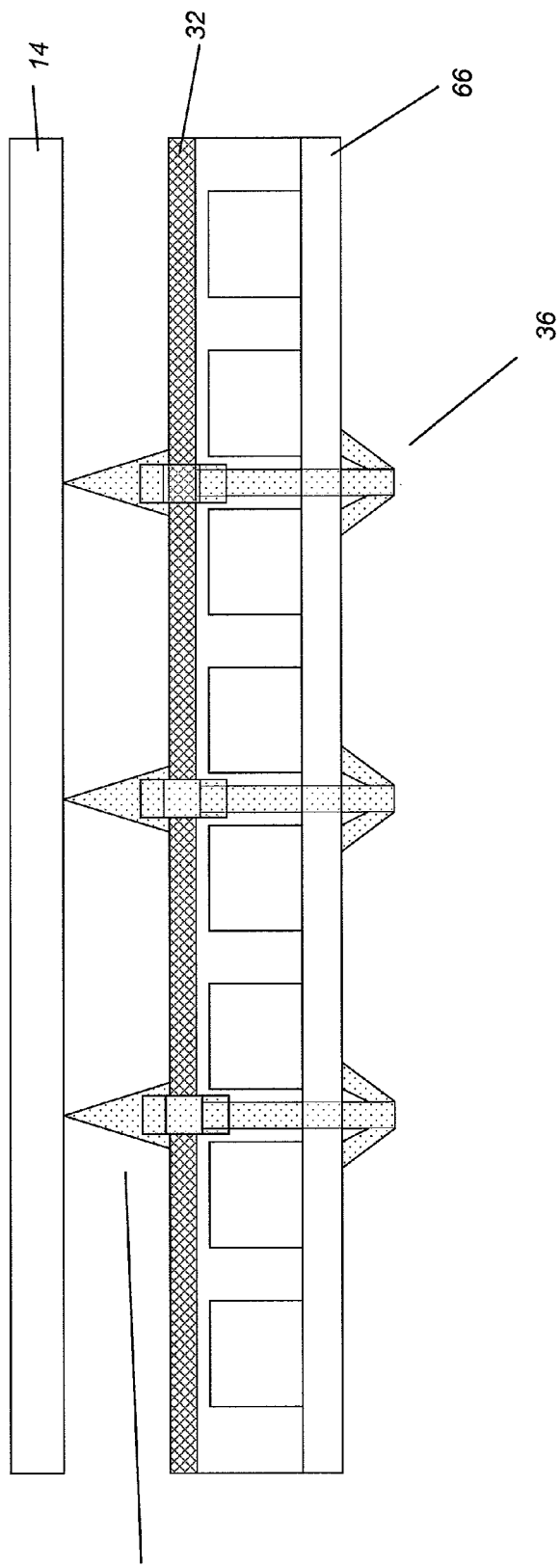
FIG. 5 is a cross section showing one embodiment of the diffusion bar and collar ring in relation to point light sources and diffuser.

FIG. 5 is a cross section view of a backlight unit assembly of the invention. FIG. 5 shows several point light sources 12 in relation to the diffusion bar and collar spacer rings. Also provided are diffuser 14 and reflective surface 66. Collar spacer rings 30 are arranged along the length of diffuser bar 32. The spacing between the collar spacer rings can be determined by factoring in the bending stiffness of top diffuser 14, weight of top diffuser 14 and the length/width of the backlight assembly. Preferably, the spacing between individual spacer collar rings is between 30 and 100 cm. Below 20 cm, the number of spacer collar rings is not cost justified, above 120 cm, the some bending of top diffuser 14 can occur, reducing the brightness uniformity of the backlight assembly.

The diffusion bar preferably contains materials that aid in the diffusion of un-coupled light and light leaking from point light sources 12. Preferred materials are selected from the list comprising forward scattering core shell particles, glass beads, immiscible polymers, inorganic scattering materials such as $TiO_2$ and $BaSO_4$, silicone materials and rubber compounds. Most preferably, the diffusion bar comprises PMMA or PC polymer containing forward scattering core-shell particles. Core shell particles have been shown to provide excellent light diffusion properties while directing the majority of the light energy toward the active or passive display. Additionally, the diffusion bar 32 preferably contains organic or inorganic dyes, pigments or colorants to modulate the color of the diffused light exiting the clip such that the color the light exiting the diffusion bar 32 has approximately the same color and the light energy exiting the surface of the light guiding films 20. Large color differences between the light output from diffusion bar 32 and light guiding film 20 would result in an undesirable visual pattern detected by human eye. Color differences can be measured in CIE color coordinates. Color differences can also be modulated in subsequent optical components such as a diffuser or prism film.

The diffusion bar may be rough having a Ra greater than 1000 nm. The term roughness average or $R_a$ means the average peak to valley height between the beads in the polymeric coating and is measured in by a profilometer and the result is expressed in micrometers. The term Ra is used to characterize the average roughness of a given area or on the surface area of an optical element. A rough spacer bar improves the diffusion efficiency of the bar. Alternatively, the spacer bar may be optically smooth having a Ra less than 500 nm. A smooth spacer bar enables some reflection of incident light energy mixing uncoupled light energy during subsequent reflections in a backlight assembly.

Figure 6:
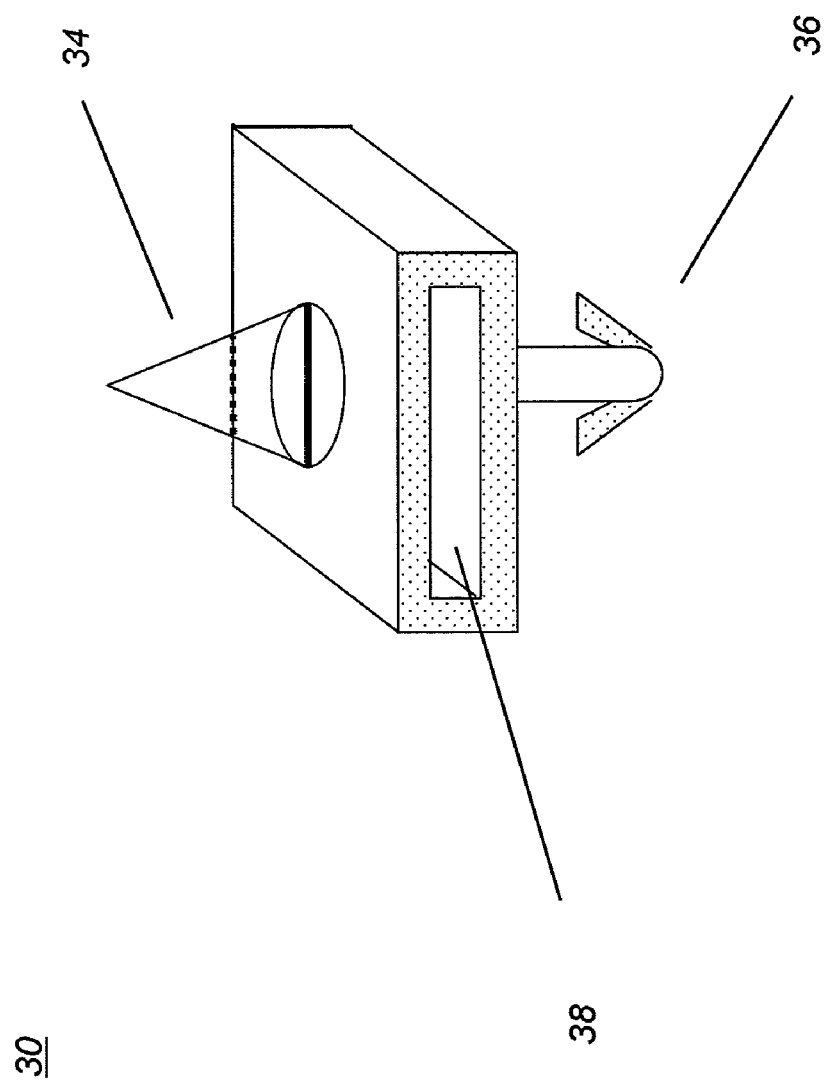
FIG. 6 is a perspective view of the one embodiment of the invention showing a collar spacer ring having an optical spacer, anchoring feature and diffusion bar opening.

FIG. 6 is a perspective view of spacer collar ring 30. Spacer collar ring is provided with optical spacer 34, diffusion bar opening 38, and integral anchoring feature 36. Diffusion bar opening 38 preferably matches the profile of the diffusion bar such that the spacer collar rings can "slide" or move down the length of diffuser bar. The spacer collar ring 30 is preferably injection molded and thus the optical spacer 34 and anchoring feature 36 are integral to the spacer collar ring. The anchoring feature 36 is any feature that allows the spacer collar ring to be jointed to a surface or structure. Examples of preferred anchoring features include screw type anchoring feature with matting screw hole, a magnetic anchoring feature with magnetic matting surface, press fit anchoring feature with a thru hole and a locking type anchoring feature as shown in FIG. 6 that is mated with a thru hole and locked with the pyramid type structure located at the tip of the anchoring feature 36. The anchoring feature allows the diffusion bar to be located and anchored to a backing surface. The anchoring feature also can aid in maintaining the integrity of the pieces of backlight film and reduce damage of the backlight assembly due to vibration encountered during manufacturing and shipment.

Figure 7:
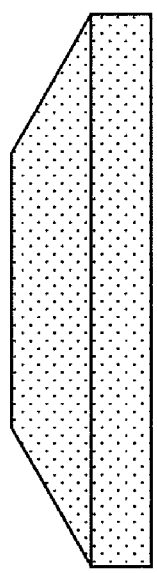
FIG. 7 is a cross section of one embodiment of the invention showing a cross section of the diffuser bar having two sloping surfaces.

FIG. 7 is a cross section view of a preferred diffusion bar profile 32. Diffusion bar 32 has two opposing sloping surfaces that terminate at a flat section. The sloping surfaces provide a means for light redirection of incident light energy from point light sources.

Figure 8:
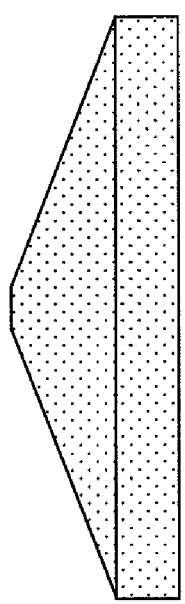
FIG. 8 is a cross section of one embodiment of the invention showing a cross section of the diffuser bar having two sloping surfaces.

FIG. 8 is a cross section view of a preferred diffusion bar profile 32. Diffusion bar 32 has two opposing sloping surfaces that terminate at a small flat section. The sloping surfaces provide a means for light redirection of incident light energy from point light sources.

Figure 9:
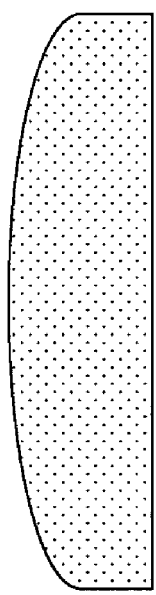
FIG. 9 is a cross section of one embodiment of the invention showing a cross section of the diffuser bar having rounded edges.

FIG. 9 is a cross section view of a preferred diffusion bar profile 32. Diffusion bar 32 has two opposing curved surfaces with rounded edges on the top of diffusion bar 32 that redirect incident light energy. The curved surfaces and the rounded corners on diffusion bar 32 allow diffusion section to both redirect and diffuse incident light energy. Further the rounded corners in the diffusion section "soften" the light transmission in the corners areas reducing illuminance changes between the light output of the diffusion bar 32 and light guiding film.

Figure 10:
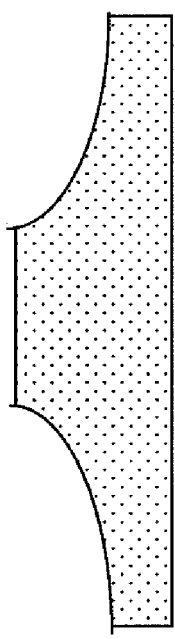
FIG. 10 is a cross section of one embodiment of the invention showing a cross section of the diffuser bar having two curved surfaces.

FIG. 10 is a cross section view of a preferred diffusion bar profile 32. Diffusion bar 32 has two opposing curved surfaces that redirect incident light energy. The two curved surfaces terminate at a flat section in FIG. 10.

Materials Used

LGF 20 may be formed from any of various types of transparent materials, including, but not limited to polycarbonate, polyethylene terephthalate (PET), polyethylene naphthalate (PEN), or polymethyl methacrylate (PMMA).

Diffusion bar and spacer collar ring may be formed from any various polymer materials, including, but not limited to polycarbonate, polyethylene terephthalate (PET), polyethylene naphthalate (PEN), or polymethyl methacrylate (PMMA), polycarbonate, polysulfone or polypropylene. The spacer collar ring and diffusion bar may be made of the same materials or may have a different material composition.

Features formed on the patterned surface of the light-guiding film help to provide illumination for LCD and other types of backlit displays, particularly for smaller displays and portable devices. Embodiments of the present invention provide a light-guiding film that can be fabricated at thickness of 1 mm or less. This makes the LGF of the present invention particularly advantageous for use with LED, OLED or laser arrays and other linear solid state light arrays.

The diffusion bar of the invention is preferably made using a process known as profile extrusion. This process is used to manufacture plastic products with a continuous cross-section such as; drinking straws, polymer gaskets, decorative molding, window trimming and a wide variety of other products polymer melt into the hollow mold cavity under high pressure.

The desired polymer is fed in pellet form into the machines hopper (this machine is known as an extruder), the material is conveyed continuously forward by a rotating screw inside a heated barrel being softened by both friction and heat. The softened polymer is then forced out through a die and directly into cool water where the product solidifies. From here it is conveyed onwards into the take-off rollers, which actually do the pulling of the softened plastic from the die.

The die is a metal plate placed at the end of the extruder with a section cut out of its interior, this cutout, and the speed of the take-off rollers, determines the cross-section of the product being manufactured. The product comes out in a solid rod because of the opening at the end of the tube, if that opening had a different cross-section than the product produced would take on that new cross-section. Basically extrusion can be defined as forcing a material through a die orifice. This die orifice produces the final shape of the finished product.

While this invention is directed toward the use of light guiding films, it is recognized that the diffusion bar and spacer collar ring may also be used with light guide plates. A light guide plate is defined as a wave guiding polymer plate used to spread out point light sources and generally has a thickness greater than 1.0 mm.

The invention claimed is:

1. An integrated backlight illumination assembly for an LCD display comprising:

a plurality of solid state light sources for providing a point light source;

a plurality of light guide films having light redirecting areas provided between the plurality of solid state light sources for redirecting and spreading the point light sources to a uniform plane of light at least one polymer diffusion bar covering said solid state light sources; and spacer collar rings comprising an optical spacer on a top portion of a collar section and an anchoring feature connected to a bottom portion of the collar section, wherein the spacer collar rings are located around a perimeter of the diffusion bar.

2. The backlight illumination assembly of claim 1 wherein the diffusion bar and the spacer collar ring comprises materials selected from polycarbonate, polymethyl methacrylate (PMMA), polystyrene, urethane, polypropylene, polysulfone and nylon.

3. The backlight illumination assembly of claim 1 wherein coefficient of thermal expansion of the diffusion bar is at least 0.2% greater than the coefficient of thermal expansion of the spacer collar ring.

4. The backlight illumination assembly of claim 1 wherein the spacer collar ring has an optical transmission of at least 5% measured over a length of 500 micrometers.

5. The backlight illumination assembly of claim 1 wherein the spacer collar ring is white and reflective.

6. The backlight illumination assembly of claim 1 wherein the spacer collar ring is white and translucent.

7. The backlight illumination assembly of claim 1 wherein the diffusion bar comprises polymer core shell particles.

8. The backlight illumination assembly of claim 1 wherein the distance between individual said spacer collar rings is between 1 and 100 cm.

9. The backlight illumination assembly of claim 1 wherein the diffusion bar comprises blue dye or pigment.

* * * * *